(12) United States Patent
Zhu et al.

(10) Patent No.: US 8,578,499 B1
(45) Date of Patent: Nov. 5, 2013

(54) SCRIPT-BASED SCAN ENGINE EMBEDDED IN A WEBPAGE FOR PROTECTING COMPUTERS AGAINST WEB THREATS

(75) Inventors: Joey Zhu, Nanjing (CN); Jialai Zhu, Nanjing (CN); Kan Dong, Nanjing (CN); Xiaodong Huang, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 79 days.

(21) Appl. No.: 13/279,746

(22) Filed: Oct. 24, 2011

(51) Int. Cl.
*G06F 11/00* (2006.01)
*G06F 7/04* (2006.01)
*G06F 11/30* (2006.01)
*H04L 29/06* (2006.01)

(52) U.S. Cl.
USPC .................. 726/25; 726/11; 726/22; 726/26; 713/154; 713/188

(58) Field of Classification Search
USPC .......... 726/24, 11, 22, 25, 26; 713/11, 22, 25, 713/26
See application file for complete search history.

(56) References Cited

U.S. PATENT DOCUMENTS

| | | | |
|---|---|---|---|
| 6,271,840 B1 | 8/2001 | Finseth et al. | |
| 6,393,591 B1 | 5/2002 | Jenkins, IV et al. | |
| 6,438,125 B1 | 8/2002 | Brothers | |
| 6,510,458 B1 | 1/2003 | Berstis et al. | |
| 6,760,884 B1 | 7/2004 | Vertelney et al. | |
| 6,785,732 B1 | 8/2004 | Bates et al. | |
| 7,070,103 B2 | 7/2006 | Melick et al. | |
| 7,118,040 B2 | 10/2006 | Melick et al. | |
| 7,236,966 B1 | 6/2007 | Jackson et al. | |
| 2005/0198692 A1 | 9/2005 | Zurko et al. | |
| 2007/0101146 A1 | 5/2007 | Louch et al. | |
| 2007/0250928 A1 | 10/2007 | Boney | |
| 2008/0080518 A1 | 4/2008 | Hoeflin et al. | |
| 2009/0089857 A1 | 4/2009 | Sabin et al. | |
| 2009/0254989 A1 | 10/2009 | Achan et al. | |
| 2009/0265786 A1 | 10/2009 | Xie et al. | |
| 2011/0300837 A1* | 12/2011 | Misiag | 455/414.2 |
| 2012/0011588 A1* | 1/2012 | Milener et al. | 726/24 |
| 2012/0198558 A1* | 8/2012 | Liu et al. | 726/25 |
| 2013/0055063 A1* | 2/2013 | Mondal et al. | 715/234 |

OTHER PUBLICATIONS

Heap spraying—Wikipedia, the free encyclopedia, 3 sheets [retrieved on Sep. 29, 2011], retrieved from the internet: http://en.wikipedia.org/wiki/Heap_spraying.
Abstract syntac tree—Wikipedia, the free encyclopedia, 2 sheets [retrieved on Sep. 30, 2011], retrieved from the internet: http://en.wikipedia.org/wiki/Abstract_syntax_tree.

(Continued)

*Primary Examiner* — Mohammad W Reza
(74) *Attorney, Agent, or Firm* — Okamoto & Benedicto LLP

(57) ABSTRACT

A script-based scan engine is embedded in a webpage requested by a client computer from a web server. The script-based scan engine may be embedded in the webpage by injecting the script-based scan engine in a header of the webpage in a computer security device between the client computer and the web server, or by integrating the script-based scan engine in the webpage as a library. The script-based scan engine executes in the client computer when the webpage is received by the client computer. The script-based scan engine scans the webpage for web threats, which may include malicious codes, exploits, and phishing, for example. The webpage is allowed to be rendered by a web browser in the client computer when the webpage is deemed safe by the script-based scan engine.

20 Claims, 4 Drawing Sheets

(56) References Cited

OTHER PUBLICATIONS

JavaScript engine—Wikipedia, the free encyclopedia, 6 sheets [retrieved on Sep. 30, 2011], retrieved from the internet: http://en.wikipedia.org/wiki/JavaScript_engine.

Fast flux—from Wikipedia, the free encyclopedia, 2 sheets [retrieved on Nov. 18, 2009], retrieved from the internet: http://en.wikipedia.org/wiki/Fast_flux.

SpringerLink—Journal Article, 2 sheets [retrieved on Nov. 23, 2009], retrieved from the internet: http://www.springerlink.com/content/t720711r28174513/?print=true.

Bioinformatics References / Help / EBI, 1 sheet [retrieved on Nov. 23, 2009], retrieved from the internet: http://www.ebiac.uk/help/references.html.

Oren Eli Zamir "Clustering Web Documents: A Phrase-Based Method for Grouping Search Engine Results", 1999 Thesis, pp. 1-208, University of Washington.

A. Blumer, et al. "Complete Inverted Files for Efficient Text Retrieval and Analysis", Jul. 1987, pp. 578-595, vol. 34, No. 3, Journal of the Association for Computing Machinery.

HTTP referer—Wikipedia, the free encyclopedia, Nov. 2007, 2 pgs, [retrieved on Nov. 20, 2007]. Retrieved from the internet<http://en.wikipedia.org/wiki/Referer.

Another malware pulls an Italian job, Jun. 18, 2007, 8 pgs, TrendLabs/Malware Blog by Trend Micro, [ retrieved on Oct. 27, 2007]. Retrieved from the internet<http://blog.trendmicro.com/another-malware-pulls-an-italian-job.

First Line of Defense by TrendLabs, Trend Micro's global Threat research and support organization, Jul. 6, 2007, 2 pgs, [retrieved on Oct. 27, 2007]. Retrieved from the internet,http://newsletters.trendmicro.com/servlet/website/ResponseForm?mgLEVTTA_TATZ_.4.

IFrame—Wikipedia, the free encyclopedia, Oct. 2007, 2 pgs,[retrieved on Oct. 29, 2007]. Retrieved from the internet<http://en.wikipedia.org/wiki/IFrame.

\* cited by examiner

SCRIPT-BASED SCAN ENGINE EMBEDDED IN A WEBPAGE FOR PROTECTING COMPUTERS AGAINST WEB THREATS

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND OF THE INVENTION

1. Field of the Invention

The present invention relates generally to computer security, and more particularly but not exclusively to methods and apparatus for protecting computers against web threats.

2. Description of the Background Art

Web threats include malicious codes (e.g., computer viruses), fraudulent schemes (e.g., phishing), coordinated attacks against particular computers, exploits, and other threats that use the Internet to perpetrate a cyber crime or malicious action. A popular technique for protecting computers against web threats includes maintaining a reputation database of known malicious web servers. The reputation database may reference a malicious web server by its uniform resource locator (URL). A computer may check the URL of a web server against the reputation database to determine the reputation of the web server. Communications to web servers having bad reputations may be blocked to prevent exposure to web threats.

Unfortunately, web threats have become more sophisticated to get around URL filtering and other web threat protection techniques. Some web threats are targeted to specific users. For example, a web threat may have different content depending on the user or be served from different URL's depending on the user's location. As a particular example, a cyber criminal may deliver malicious content via an advertisement network. In that case, it is difficult to detect the malicious content because an advertisement provider may randomly choose different content by geographic location or user profile.

SUMMARY

In one embodiment, a method of protecting computers against web threats includes embedding a script-based scan engine into a webpage requested by a client computer. The webpage with the embedded script-based scan engine is received in the client computer. The script-based scan engine is executed in the client computer. The script-based scan engine parses the webpage to extract webpage content of the webpage. The script-based scan engine scans the webpage content for web threats. The webpage is allowed to be rendered by a web browser in the client computer when the webpage is deemed safe by the script-based scan engine.

In one embodiment, a method of protecting computers against web threats includes receiving a hypertext transport protocol (HTTP) response from a web server hosting a webpage, the HTTP response including the webpage and is responsive to an HTTP request sent by a client computer. The HTTP response is modified to inject a script-based scan engine into the webpage to generate a modified HTTP response. The modified HTTP response is forwarded to the client computer. The script-based scan engine is executed in the client computer to scan the webpage for web threats. The webpage is allowed to be rendered by a web browser in the client computer when the script-based scan engine deems the webpage to be free of web threats.

In one embodiment, a method of protecting computers against web threats includes receiving a webpage with an embedded JavaScript scan engine in a client computer. The JavaScript scan engine is executed in the client computer. The JavaScript scan engine scans the webpage for web threats. The webpage is allowed to be rendered by a web browser in the client computer when the webpage is deemed safe by the JavaScript scan engine.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
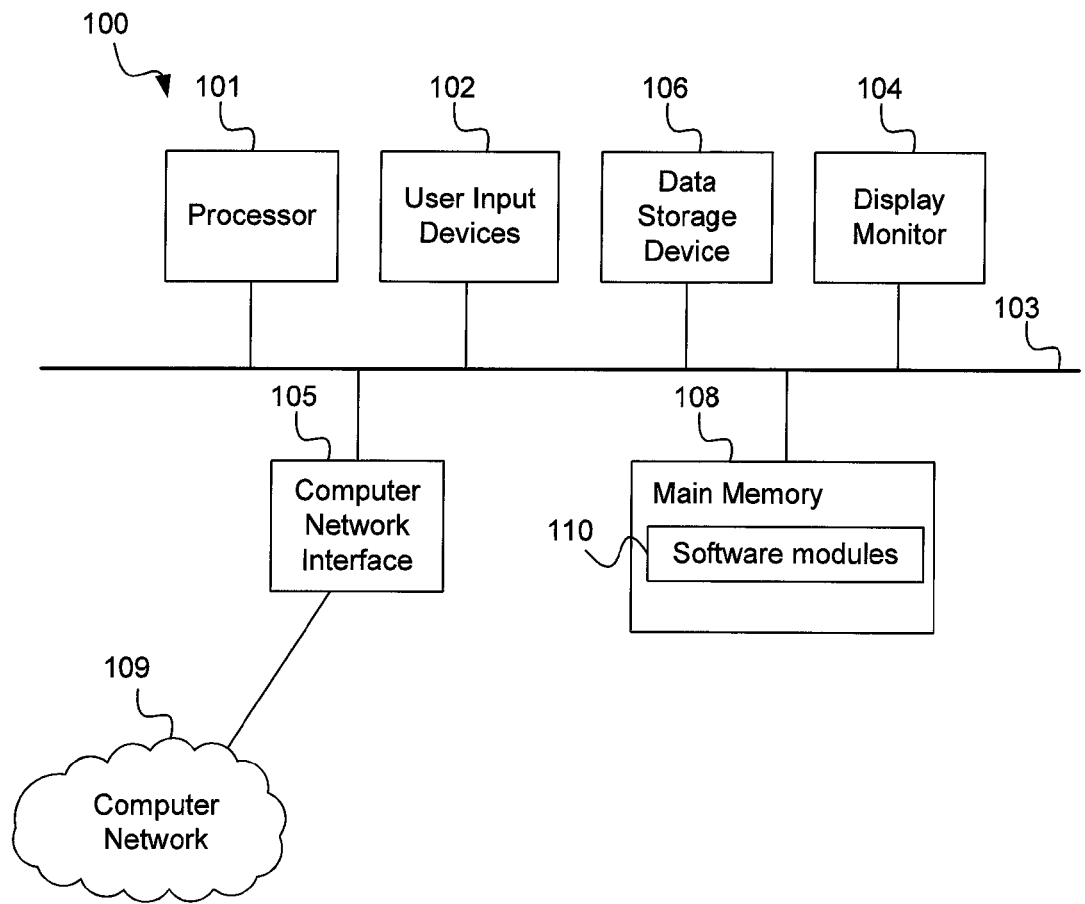
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as a client computer, and other computers described below. The computer 100 may have fewer or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. The computer 100 may be configured to perform its functions by executing the software modules 110. The software modules 110 may be loaded from the data storage device 106 to the main memory 108. The software modules 110 may also be made available in other computer-readable medium including optical disk, flash drive, and other memory devices.

Figure 2:
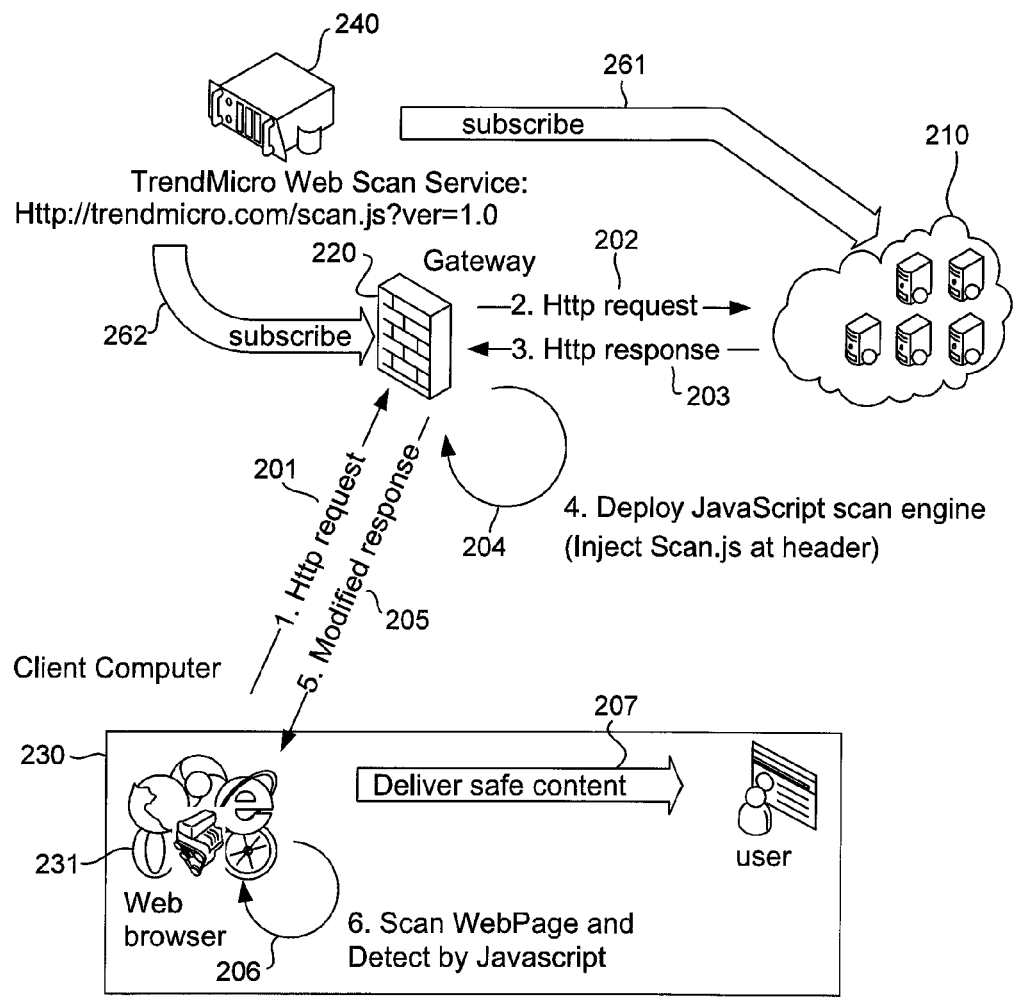
FIG. 2 shows a flow diagram schematically illustrating use of a script-based scan engine to protect a client computer against web threats in accordance with an embodiment of the present invention.

FIG. 2 shows a flow diagram schematically illustrating use of a script-based scan engine to protect a client computer against web threats in accordance with an embodiment of the present invention. In the example of FIG. 2, the script-based scan engine is implemented using JavaScript, and is named "scan.js." The script-based scan engine may be hosted in a support server computer 240 of a computer security vendor. In the example of FIG. 2, the computer security vendor is Trend Micro. Inc., the assignee of the present invention, and the script-based scan engine is available from the Internet URL "trendmicro.com/scan.js?ver=1.0". The script-based scan engine may be made available to subscribing web servers (arrow 261) or computer security devices (arrow 262). In the example of FIG. 2, the script-based scan engine may be embedded in webpages as stored and served by the web servers 210. The web servers 210 may be hosted by one or more server computers. A web server 210 may integrate the script-based scan engine into a webpage as a library, similar to JQuery. The script-based scan engine may also be embedded by a computer security device, such as a gateway, appliance, or firewall, in a received webpage. For example, a computer security device may receive a webpage, modify the webpage by injecting the script-based scan engine in the header of the webpage, and provide the modified webpage to its destination client computer.

In the example of FIG. 2, a client computer 230 is part of a private computer network, such as an enterprise or home computer network. There may be a plurality of client computers 230 in any given computer network but only one is shown and FIG. 2 for clarity of illustration. A client computer 230 may comprise a personal computer, such as a desktop or notebook computer, that includes a JavaScript-enabled web browser 231. The web browser 231 may be a commercially-available web browser, such as the Microsoft Internet Explorer™ web browser. A gateway 220 serves as a computer security device protecting the perimeter of the private computer network. The gateway 220 connects client computers 230 within the private computer network to the Internet.

In an example operation, a user of a client computer 230 employs the web browser 231 to browse webpages served by web servers 210 on the Internet. To receive a webpage, the web browser 231 sends an HTTP (hypertext transport protocol) request for the webpage (arrow 201). The HTTP request is received by the gateway 220, which forwards the HTTP request to the web server 210 hosting the webpage (arrow 202). The web server 210 responds to the HTTP request by sending an HTTP response that includes the requested webpage (arrow 203). The HTTP response is received by the gateway 220.

In one embodiment, the requested webpage as provided by the web server 210 does not include an embedded script-based scan engine. Accordingly, the gateway 220, or another computer security device between the client computer 230 and the web server 210, receives the HTTP response from the web server 210 and modifies the HTTP response by embedding the script-based scan engine into the webpage (arrow 204). In the example of FIG. 2, the gateway 220 does so by inserting the script-based scan engine scan.js in the header of the webpage. In other embodiments, the requested webpage already includes an embedded script-based scan engine as stored by the web server 210. That is, the HTTP response from the web server 210 (i.e., arrow 203) includes a webpage with an embedded script-based scan engine.

Although the webpage may be scanned for web threats in a computer security device external to the client computer, such as in the gateway 220, with full scale scanning, such an approach may overburden the computation resource of the computer security device. The approach presented here, i.e., embedding the script-based scan engine in the webpage and executing the script-based scan engine in the client computer, takes advantage of the computing resource of the client computer. As can be appreciated, even though the scanning for web threats is performed in the client computer, the client computer itself does not have to maintain a web threat scanner because the scanner is provided with the webpage. This makes the script-based scan engine easier to deploy compared to locally maintained antivirus.

The gateway 220 forwards the webpage with the embedded script-based scan engine to the client computer 230 (arrow 205). There, the web browser 231 receives the webpage and starts executing the script-based scan engine. The script-based scan engine scans the content of the webpage, e.g. HTML (hypertext markup language) code in the body of the webpage, for web threats (arrow 206). For example, the script-based scan engine may scan the webpage for malicious codes and exploits. The script-based scan engine may perform a predetermined security action at any time it detects a web threat. The predetermined security action may include blocking the webpage from being rendered by the web browser 231, for example. The script-based scan engine allows the webpage to be rendered when the webpage is deemed to be safe, i.e., does not contain a web threat (arrow 207).

As can be appreciated, evaluating the webpage in the destination client computer allows the webpage to be scanned for web threats regardless of where the webpage was served from or the location of the client computer. Furthermore, because the scanning for web threats is integrated with the web browser, the scanning is performed for each browser session. Also, unlike centralized scanning in a remotely located computer security device, each user may be given control of the scanning session (e.g., scan webpages from one web server but not another) to meet individual privacy and user concerns.

Figure 3:
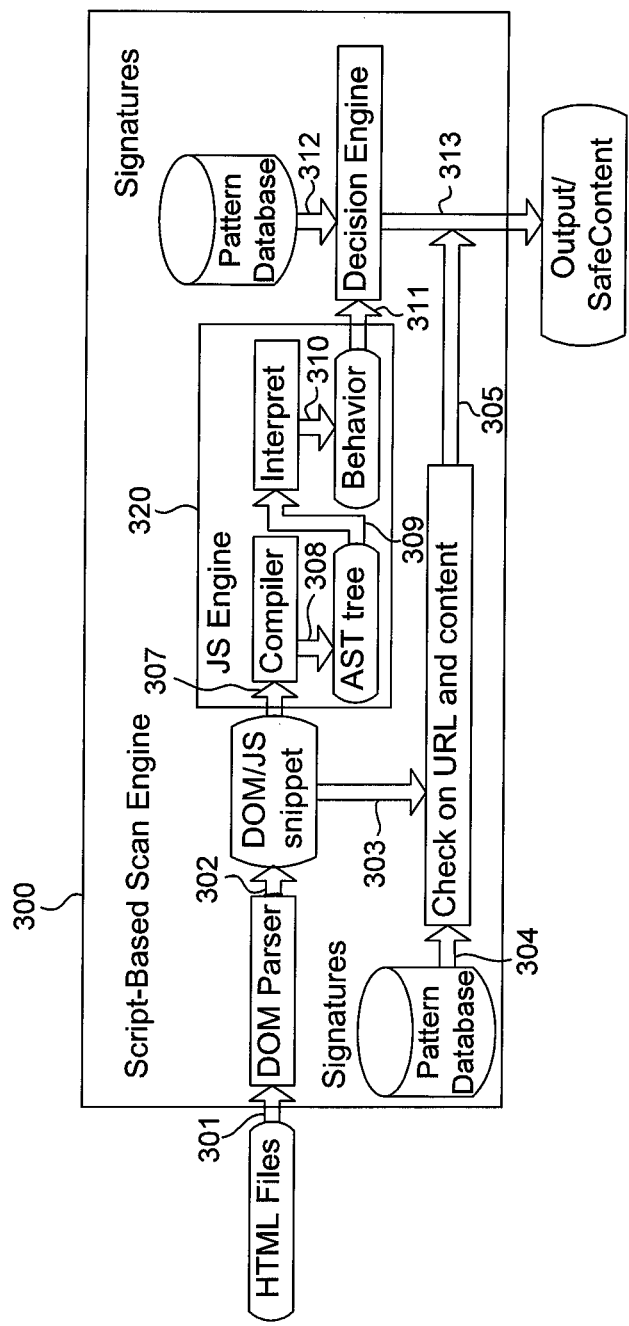
FIG. 3 schematically shows a script-based scan engine for detecting web threats in webpages in accordance with an embodiment of the present invention.

FIG. 3 schematically shows a script-based scan engine 300 for detecting web threats in webpages in accordance with an embodiment of the present invention. In one embodiment, the script-based scan engine 300 comprises computer-readable program code configured to parse a webpage to extract webpage content from the webpage, match the webpage content against patterns indicative of web threats, and interpret executable code included in the webpage content to detect behavior indicative of web threats. The script-based scan engine 300, and all of its components including parser, compiler, interpreter, and decision engine, is preferably implemented by JavaScript. The script-based scan engine 300 may be embedded into a webpage for delivery to the client computer 230 as previously described.

The script-based scan engine 300 is received in the client computer 230 where it is executed by the web browser 231. The script-based scan engine 300 receives HTML files/code (arrow 301), such as those from the body of the webpage where the script-based scan engine 300 is embedded. The script-based scan engine 300 includes a Document Object Model (DOM) parser to extract webpage content, such as DOM and/or JavaScript snippets, from the webpage (arrow 302). The webpage content extracted from the webpage (arrow 303) are compared to signatures in a pattern database (arrow 304), which may be stored in a local HTML storage, such as a local cache of the web browser 231. The signatures may comprise bit patterns, URLs, behavior patterns and other information indicative of web threats. The signatures may be compiled by antivirus researchers based on known web threats. A basic signature set may be included with the script-based scan engine 300, with additional/incremental signatures being made available to the script-based scan engine 300 by requesting them from the support server computer 240.

The script-based scan engine 300 may employ a pattern matching algorithm in comparing the contents of the webpage, including the URL of the webpage, outbound URL's referenced in the webpage, and bit patterns (e.g., HTML tags, data, etc.), to signatures of known web threats (arrow 304). The script-based scan engine 300 may be configured to perform a predetermined security action upon detection of a web threat. The predetermined security action may include blocking the webpage from being rendered. The script-based scan engine 300 allows the webpage to be rendered when the webpage is deemed to be safe (arrow 305).

A JavaScript engine 320, which serves as an emulator, receives executable content extracted from the webpage (arrow 307). The JavaScript engine 320 is configured to emulate execution of the executable content to observe the behavior of the webpage in a safe environment (e.g., a sandbox) before allowing the webpage to be rendered by the web browser 231 for user viewing and interaction. The script-based scan engine 300 is executed by the web browser 231 first to allow hooking of execution of the JavaScript engine 320. In one embodiment, the JavaScript engine 320 compiles DOM and/or JavaScript snippets to generate a corresponding Abstract Syntax Tree (AST) (arrow 308). The JavaScript engine 320 interprets the AST (309) to reveal the behavior of the webpage (arrow 310). Script snippets may be executed by the JavaScript engine 320 one by one for more effective behavior monitoring. A decision engine observes the behavior of the webpage (arrow 311), and compares the observed behavior to behavior patterns in the signatures of known web threats (arrow 312) to determine if the webpage behavior is indicative of a web threat. If the behavior of the webpage matches that of a known web threat, the script-based scan engine 300 performs a predetermined security action, such as blocking the webpage. Otherwise, if the behavior of the webpage does not match a behavior pattern in the signatures, the script-based scan engine 300 deems the webpage to be safe and allows the webpage to be rendered by the web browser for viewing by the user (arrow 313).

An example web threat that may be detected by the script-based scan engine 300 is the so-called "Aurora" exploit. The Aurora exploit uses the comment element to perform a heap spray. The following pseudo-code provides an example code structure that may be employed by the script-based scan engine 300 to detect the just mentioned characteristics, and thus the Aurora exploit.

```
window.DOMDocument=function(file){
    this._file=file;
    this.dom=htmlparse(file);
};
DOMDocument.prototype={
    createElement:function(name){
        return    makeNode(this.dom.createElement(name-
            .toLowerCase( ));
    },
    . . .
Behaviors=EmulateScript(window._dom.scripts)
```

To detect the Aurora exploit, the above code structure records the number of comment elements that are created and destroyed by the webpage being emulated. The following additional JavaScript pseudo-code detects heap spray indicative of the Aurora exploit.

```
Function Makedecision(behaviors){
    If(AllocateMemory(behaviors)>1000000)
        Return HEAP_SPRAY_DETECTED;
    . . .
}
```

Figure 4:
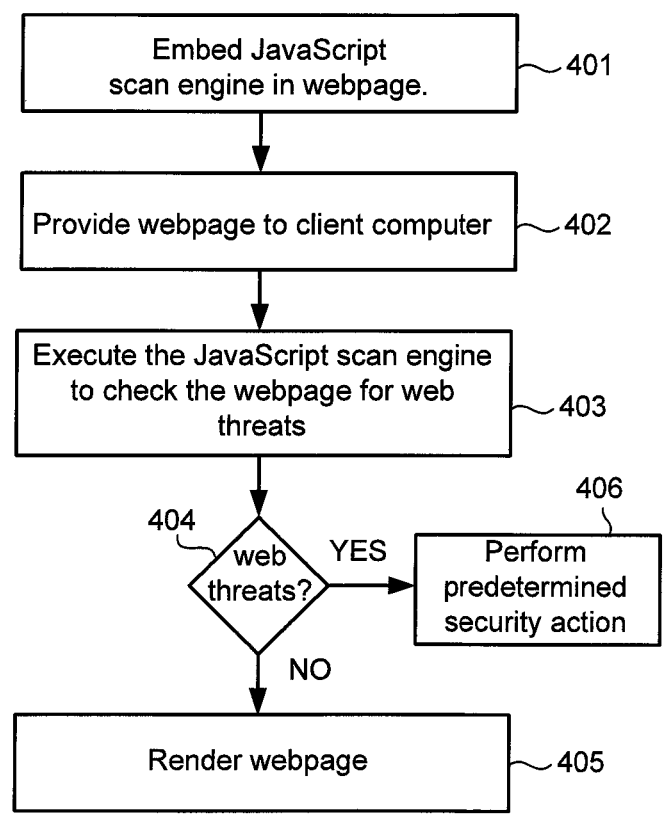
FIG. 4 shows a flow diagram of a method of using a script-based scan engine to protect a client computer against web threats in accordance with an embodiment of the present invention.

FIG. 4 shows a flow diagram of a method of using a script-based scan engine to protect a client computer against web threats in accordance with an embodiment of the present invention. The method of FIG. 4 may be performed using the components shown in FIGS. 2 and 3. Other components may also be employed without detracting from the merits of the present invention.

The method of FIG. 4 includes embedding a JavaScript scan engine in a webpage to be delivered to a client computer requesting the webpage (step 401). The JavaScript scan engine may be embedded into the webpage by integrating it into the webpage (e.g., as a library) or by injecting it into the webpage (e.g., in the header of the webpage) at a computer security device between the client computer and the web server hosting the webpage. The webpage with the embedded JavaScript scan engine is provided to the client computer (step 402). The JavaScript scan engine executes in the client computer to check the webpage for web threats (step 403). The JavaScript scan engine may parse the webpage to extract the webpage's content. The JavaScript scan engine may compare the extracted webpage content against signatures of known web threats (step 404). The JavaScript scan engine may allow the webpage to be rendered when the webpage is deemed to be free of web threats (step 405). Otherwise, when a web threat is found in the webpage, the JavaScript scan engine may perform a predetermined security action (step 406). The predetermined security action may include preventing the webpage from being rendered by the web browser, blocking communication with the web server hosting the webpage, and other actions for protecting the client computer.

Techniques for protecting computers against web threats have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of protecting computers against web threats, the method comprising:

embedding a script-based scan engine into a webpage requested by a client computer;

receiving the webpage with the embedded script-based scan engine in the client computer;

executing the script-based scan engine in the client computer;

the script-based scan engine parsing the webpage to extract webpage content of the webpage;

the script-based scan engine scanning the webpage content for web threats; and allowing the webpage to be rendered by a web browser in the client computer when the webpage is deemed safe by the script-based scan engine.

2. The method of claim 1 wherein the script-based scan engine scans the webpage content for web threats by comparing the webpage content against bit patterns of known web threats.

3. The method of claim 1 wherein the script-based scan engine scans the webpage content for web threats by comparing a behavior of executable content extracted from the webpage against behavior patterns of known web threats.

4. The method of claim 1 wherein the script-based scan engine is injected in a header of the webpage.

5. The method of claim 1 wherein the script-based scan engine is integrated with the webpage as a library.

6. The method of claim 1 wherein the web threat comprises an exploit.

7. The method of claim 1 wherein the web threat comprises malicious codes.

8. The method of claim 1 wherein the script-based scan engine is in the header of the webpage and the script-based scan engine scans a body of the webpage.

9. A method of protecting computers against web threats, the method comprising:
- receiving a hypertext transport protocol (HTTP) response from a web server hosting a webpage, the HTTP response including the webpage and is responsive to an HTTP request sent by a client computer;
- modifying the HTTP response to inject a script-based scan engine into the webpage to generate a modified HTTP response;
- forwarding the modified HTTP response to the client computer;
- in the client computer, executing the script-based scan engine to scan the webpage for web threats; and
- allowing the webpage to be rendered by a web browser in the client computer when the script-based scan engine deems the webpage to be free of web threats.

10. The method of claim 9 wherein the script-based scan engine is injected in a header of the webpage.

11. The method of claim 10 wherein the script-based scan engine scans a body of the webpage for web threats.

12. The method of claim 9 wherein the script-based scan engine scans a body of the webpage for malicious codes.

13. The method of claim 9 wherein the script-based scan engine scans a body of the webpage for outbound uniform resource locators.

14. The method of claim 9 wherein the script-based scan engine scans the webpage for web threats by emulating executable content of the webpage to detect a behavior of the webpage and comparing the behavior of the webpage to behavior of known web threats.

15. A method of protecting computers against web threats, the method comprising:
- receiving a webpage with an embedded JavaScript scan engine in a client computer;
- executing the JavaScript scan engine in the client computer;
- the JavaScript scan engine scanning the webpage for web threats; and
- allowing the webpage to be rendered by a web browser in the client computer when the webpage is deemed safe by the JavaScript scan engine.

16. The method of claim 15 wherein the JavaScript scan engine scans the webpage for web threats by comparing content of the webpage against bit patterns of known web threats.

17. The method of claim 15 wherein the JavaScript scan engine scans the webpage for web threats by comparing a behavior of executable content extracted from the webpage against behavior patterns of known web threats.

18. The method of claim 15 wherein the JavaScript scan engine scan engine is injected in a header of the webpage and the JavaScript scan engine scans a body of the webpage.

19. The method of claim 15 wherein the script-based scan engine is integrated with the webpage as a library.

20. The method of claim 15 wherein the web threat comprises an exploit.

* * * * *